(12) United States Patent
Khan et al.

(10) Patent No.: US 12,711,011 B2
(45) Date of Patent: Aug. 18, 2026

(54) SYSTEMS AND METHODS FOR RESOLVING CHAINCODE EXECUTION INTERRUPTION IN A BLOCKCHAIN NETWORK

(71) Applicant: Verizon Patent and Licensing Inc., Basking Ridge, NJ (US)

(72) Inventors: Ahmed A. Khan, Plano, TX (US); Mohammed Alsadi, Redmond, WA (US); Joel Jimenez, Flemington, NJ (US); Carl Paul Coursen, Wilmington, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 12 days.

(21) Appl. No.: 18/956,537

(22) Filed: Nov. 22, 2024

(65) Prior Publication Data

US 2026/0147662 A1 May 28, 2026

(51) Int. Cl.
*G06F 11/00* (2006.01)
*G06F 11/07* (2006.01)

(52) U.S. Cl.
CPC ...... *G06F 11/0793* (2013.01); *G06F 11/0721* (2013.01); *G06F 11/079* (2013.01)

(58) Field of Classification Search
CPC . G06F 11/0793; G06F 11/0721; G06F 11/079
See application file for complete search history.

(56) References Cited

U.S. PATENT DOCUMENTS

2003/0196141 A1* 10/2003 Shaw .................. G06F 11/0724 714/48
2010/0153955 A1* 6/2010 Sirota .................. G06F 9/4806 718/102
2023/0078996 A1* 3/2023 Jayachandran ..... G06F 16/9024 713/161
2025/0055752 A1* 2/2025 Nyamwange ....... H04L 41/0627

* cited by examiner

*Primary Examiner* — Jason B Bryan

(57) ABSTRACT

A system described herein may receive a request to perform a blockchain operation that includes a set of computations; identify portions of the blockchain operation, which each include a respective subset of the set of computations; perform a first subset of computations, of the set of computations, that are associated with a first portion of the blockchain operation; identify a set of outputs that result from performing the first subset of computations; identify, prior to completing the blockchain operation, a failure condition that prevents complete performance of a second subset of computations; perform the second subset of computations using the set of outputs that result from performing the first subset of computations; and communicate with a plurality of nodes, that maintain a blockchain, to record a result of performing the first and second subsets of computations to the blockchain.

20 Claims, 9 Drawing Sheets

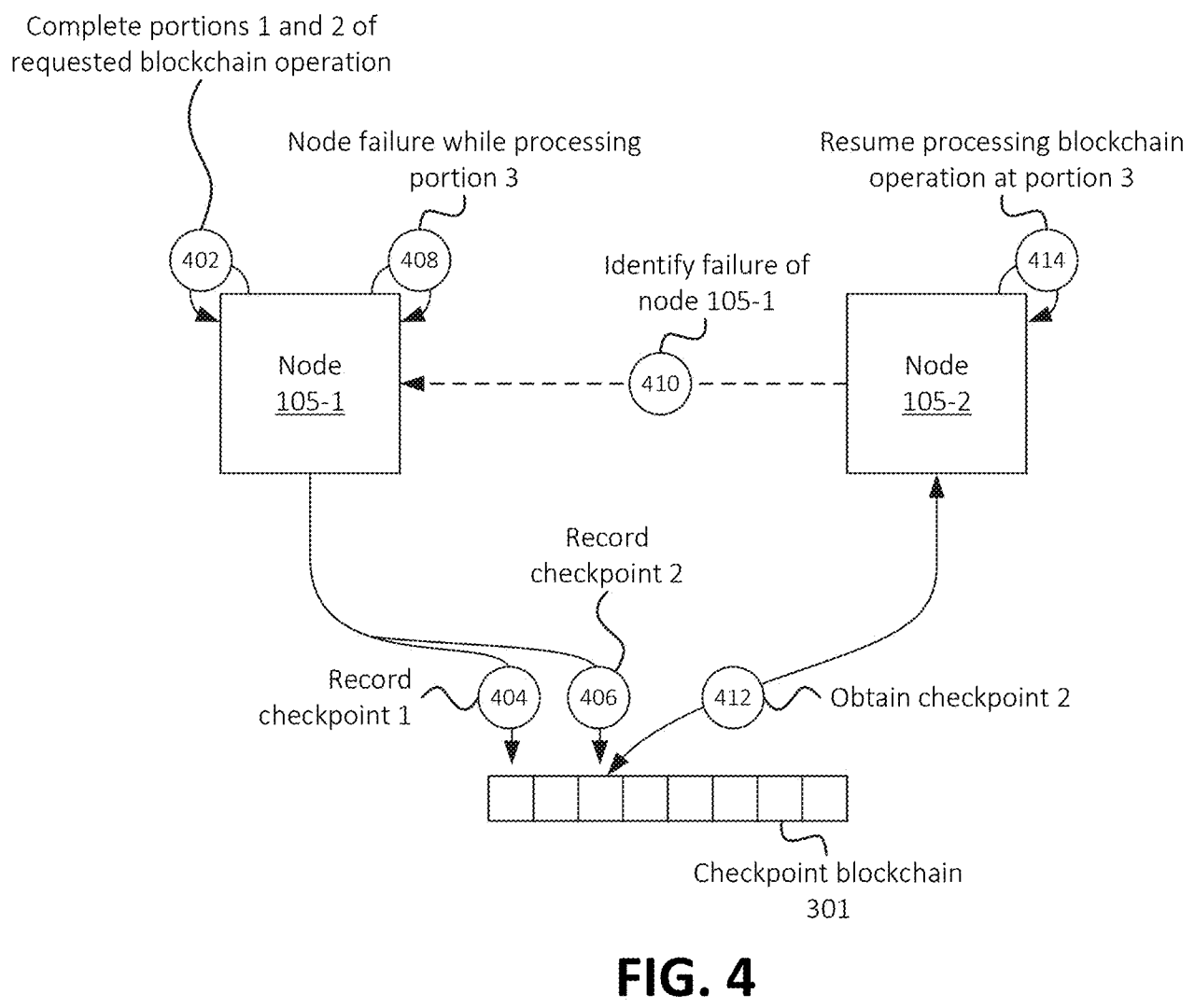

Complete portions 1 and 2 of requested blockchain operation

402

Node failure while processing portion 3

408

Node 105-1

Record checkpoint 1

404

Record checkpoint 2

406

Identify failure of node 105-1

410

Node 105-2

Resume processing blockchain operation at portion 3

414

Obtain checkpoint 2

412

Checkpoint blockchain 301

FIG. 4

SYSTEMS AND METHODS FOR RESOLVING CHAINCODE EXECUTION INTERRUPTION IN A BLOCKCHAIN NETWORK

BACKGROUND

Blockchains provide for the decentralized and secure storage of data, decentralized computing, or other technical operations. Blockchains may further provide for the immutability of recorded data (e.g., as maintained by computing devices that implement nodes), as data may not be altered once recorded to a blockchain. Blockchains may be maintained by multiple nodes, such as geographically distributed or otherwise distinct servers, workstations, etc., that each maintain local copies of respective blockchains, perform computing operations based on information (e.g., executable code, instructions, variables, etc.) recorded to respective blockchains, and/or perform other operations.

BRIEF DESCRIPTION OF THE DRAWINGS

FIG. 4 illustrates an example of resuming an in-progress blockchain operation by a different node than a node that started the blockchain operation, in accordance with some embodiments;

DETAILED DESCRIPTION OF EXAMPLE EMBODIMENTS

The following detailed description refers to the accompanying drawings. The same reference numbers in different drawings may identify the same or similar elements.

Organizations often provide network management services to multiple enterprise customers. Often, each of these customers desires a secure and isolated environment to manage their own network configurations, monitor network performance, and implement many other functionalities. Some of these configuration and performance monitoring and modification operations may occur through the use of blockchain technology. Furthermore, in today's networking environment, managing network resources, such as bandwidth, dynamically and in an efficient manner is a key factor to ensuring optimal network performance and Quality of Service ("QoS"). In this dynamic environment, network operators, such as mobile network operators ("MNOs"), often need to adjust network parameters such as bandwidth allocations, beamforming parameters, network slice access control parameters, or other network configuration parameters in real time or near-real time to address the traffic loads and priority levels of applications and users. In this sense, providing the ability to quickly request and/or implement such network configuration parameters may aid in ensuring efficient operation of the network.

Figure 1:
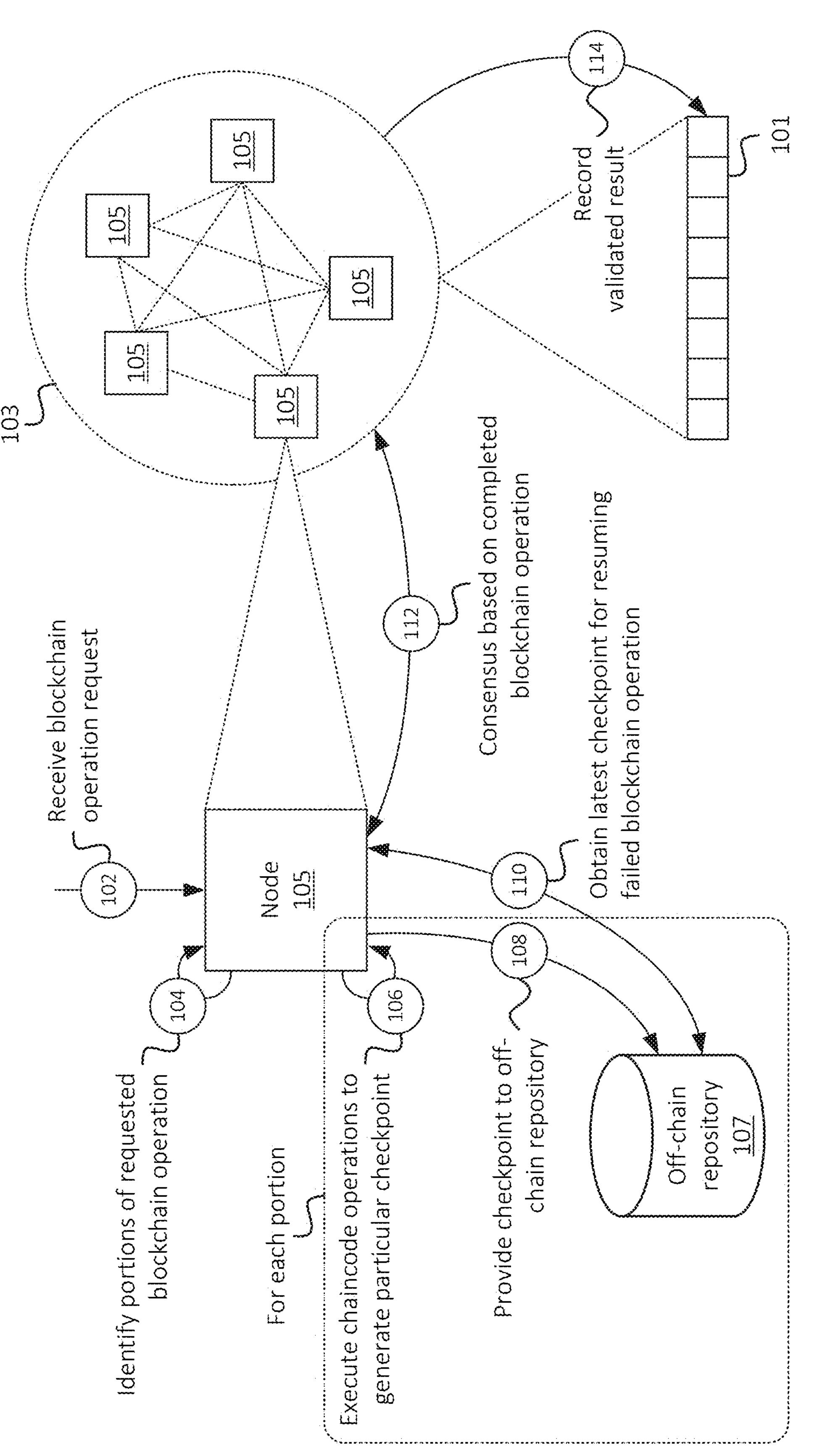
FIG. 1 illustrates an example overview of one or more embodiments described herein.

Using blockchains to implement such configuration operations may provide significant advantages due to the nature of blockchain technology. For example, as shown in FIG. 1, a particular blockchain 101 may be maintained by a particular blockchain network 103, which includes multiple nodes 105. Nodes 105 may include devices or systems such as geographically distributed or otherwise distinct servers, workstations, etc., that communicate with each other to maintain local copies of blockchain 101. For example, nodes 105 may maintain local copies of blockchain 101, and changes to blockchain 101 (e.g., adding blocks based on computations, chaincode operations, or other suitable operations by one or more nodes 105) may be subject to satisfying a consensus mechanism implemented by blockchain network 103. As discussed below, the consensus mechanism may include multiple nodes 105 validating, approving, confirming, etc. the results of executing a requested operation or set of operations (e.g., chaincode operations) prior to such results being recorded or committed to blockchain 101. The consensus mechanism may aid in avoiding unauthorized changes from being made to the blockchain, thus providing a measure of immutability to the blockchain.

Prior to implementing the consensus mechanism to validate the results of a requested blockchain operation (e.g., where such blockchain operation may include executing chaincode and/or performing other suitable computations or operations), one or more nodes 105 may perform the requested blockchain operation in order to generate a result for confirmation or validation by other nodes 105 via the consensus mechanism. The requested blockchain operation may potentially be relatively complex, resource-intensive, and/or time-consuming. In some situations, a given node may fail to perform a requested blockchain operation in its entirety due to factors such as, for example, network connectivity issues associated with the node, hardware failures associated with the node, and/or other types of random or unpredictable conditions.

In typical implementations, when the node fails to perform a blockchain operation in its entirety (e.g., due to some failure or other type of circumstance as noted above), the node would reattempt to perform the blockchain operation from the beginning. This type of implementation may include repeating computations, calculations, or other portions of a blockchain operation that have already been performed. For example, consider a situation in which a node has completed a substantial portion of a requested blockchain operation, such as 95% of the computations needed to generate a final result of the blockchain operation, and then experiences a failure that prevents the node from completing the final 5% of the blockchain operation. In a typical implementation, reattempting the blockchain operation may include starting from the beginning of the blockchain operation, without utilizing any of the processing previously performed. In this sense, the greater the amount of progress on completing a blockchain operation prior to experiencing a failure, the greater the amount of time and resources would be lost when reattempting the blockchain operation from the beginning.

Embodiments described herein provide for a checkpointing mechanism, in which nodes 105 of blockchain network 103 dynamically identify portions of a requested blockchain operation, and generate checkpoints that are based on the result of performing respective portions of the blockchain operation. These checkpoints may be used by node 105 (and/or one or more other nodes 105 of blockchain network 103) to resume processing partially processed blockchain operations, in the event that node 105 experiences a failure or other issue preventing the complete processing of a given blockchain operation. For example, the checkpoints may include values, variables, retrieved or generated data, context information, state information, and/or other suitable information that may be used to resume processing a blockchain operation, rather than needing to reattempt the blockchain operation from the beginning. Resuming the operation in such a manner may consume fewer processing resources and time than other implementations, such as implementations that handle blockchain operation processing failures by reattempting the entire blockchain operation even if substantial processing has already been completed prior to the failure.

FIG. 1 illustrates an example overview of some embodiments. As shown, node 105 may receive (at 102) a request to perform a particular blockchain operation. In some embodiments, a blockchain operation may include or may refer to executing processing operations specified by or represented as chaincode, functions, sub-routines, or the like. In some implementations, the chaincode, functions, etc. may be recorded to and retrieved from blockchain 101 or from some other blockchain. In some implementations, the chaincode, functions, etc. may be included in or specified in the request (at 102). In some implementations, the chaincode, functions, etc. may be implemented via one or more application programming interfaces ("APIs"), software development kits ("SDKs"), frameworks, etc. implemented by node 105.

In accordance with some embodiments, node 105 may identify (at 104) portions of the requested blockchain operation. As noted above, the blockchain operation may include a set of processing operations and/or other types of operations, such as network communication operations (e.g., retrieving data from an external data source or communicating with some other device or system) or other types of operations. In some examples, the blockchain operation may include multiple discrete function calls (e.g., instructions to execute multiple functions, chaincode, suitable-routines, or the like). In some examples, the blockchain operation may include generating intermediate values such as hash values, and performing further operations on the intermediate values.

Node 105 may, in some embodiments, utilize artificial intelligence/machine learning ("AI/ML") techniques or other suitable analysis techniques (e.g., code complexity analysis techniques) to identify respective portions of the blockchain operation. For example, in some embodiments, a blockchain operation specifying four separate function calls may be considered as having four portions (i.e., each portion may include one of the four separate function calls). In some embodiments, the example blockchain operation specifying four separate function calls may be considered as having fewer or greater than four portions. For example, node 105 may identify that the first and second function calls are associated with a relatively low measure of complexity, and may identify a first portion including the first and second function calls, a second portion including the third function call, and a third portion including the fourth function call. On the other hand, node 105 may identify that the first function call is relatively complex, and may identify a first portion including a first sub-portion of the first function call, a second portion including a second sub-portion of the first function call, and so on.

The blockchain operation may be associated with a set of inputs and a set of outputs. In a simplistic example, the set of inputs may include value to record to blockchain 101, and the set of outputs may include a cryptographic hash generated based on the value. The blockchain operation may include one or more calculations, computations, or other types of processing operations to perform on the provided input value (and/or on intermediate values generated based on the input value) in order to ultimately generate the cryptographic hash. In an example where generating the hash includes performing multiple discrete calculations, each portion may be associated with one of the discrete calculations. Thus, each of the portions may themselves be associated with a respective set of inputs and a respective set of outputs. The inputs for a given portion (e.g., a third portion) may be, or may include, the output of another portion (e.g., the output of a second portion). In this sense, the inputs for the third portion (i.e., the output of the second portion) may be considered as "intermediate values," as such values are used in ultimately generating the output of the blockchain operation, but are not necessarily explicitly provided as the output of the blockchain operation itself.

In some embodiments, the request itself may include or specify information defining portions of the requested blockchain operation. In some embodiments, some other device or system that is communicatively coupled to node 105 may identify (at 104) the portions of the requested blockchain operation, and may indicate such portions to node 105.

Node 105 may further proceed with performing (e.g., processing, computing, etc.) the requested blockchain operation. Performing the requested blockchain operation may include performing the computations, calculations, etc. of each respective portion. In some situations, node 105 may perform such computations, calculations, etc. sequentially. In some situations, node 105 may perform some or all of such computations, calculations, etc. in parallel (e.g., in situations where a given function call does not depend on the output of another function call).

As shown, for each portion, node 105 may perform (at 106) computations, perform calculations, and/or otherwise execute chaincode (or other types of executable code) associated with such portion. Executing a particular portion may result in generating a checkpoint associated with the portion. A "checkpoint" as referred to herein may include variables, values, context information, state information, and/or other types of outputs that result from performing the calculations, chaincode, etc. associated with a respective portion of a requested chaincode operation. For example, as discussed below, executing a relatively complex set of calculations, chaincode, etc. to generate a checkpoint associated with a respective portion may make it unnecessary to again execute the same set of calculations, chaincode, etc., as the checkpoint includes the result (or results) of such calculations, chaincode, etc.

Node 105 may further provide (at 108) each checkpoint, associated with each respective portion, to off-chain repository 107. In some embodiments, off-chain repository 107 may include a database, a cloud storage system, a storage device implemented by the same set of hardware resources that implement node 105, and/or some other type of suitable information repository that is communicatively coupled to node 105.

Figure 2:
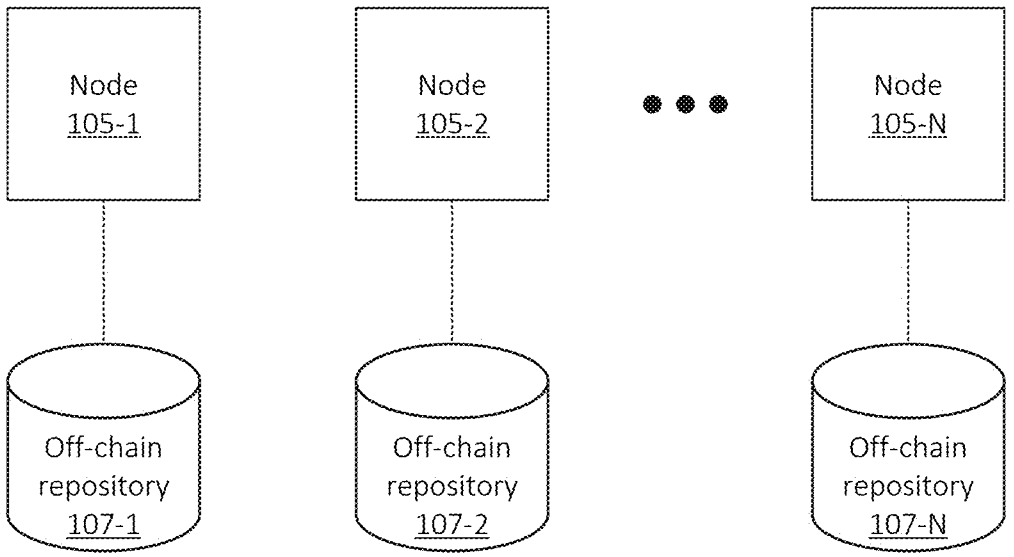
FIG. 2 illustrates an example arrangement of off-chain repositories for storing checkpoints, in accordance with some embodiments.

In some embodiments, as shown in FIG. 2, multiple nodes 105 may separately implement off-chain repositories 107, and/or may be communicatively coupled to respective off-chain repositories 107. For example, node 105-1 may be communicatively coupled to off-chain repository 107-1, node 105-2 may be communicatively coupled to off-chain repository 107-2, node 105-N may be communicatively coupled to off-chain repository 107-N, and so on.

Figure 3:
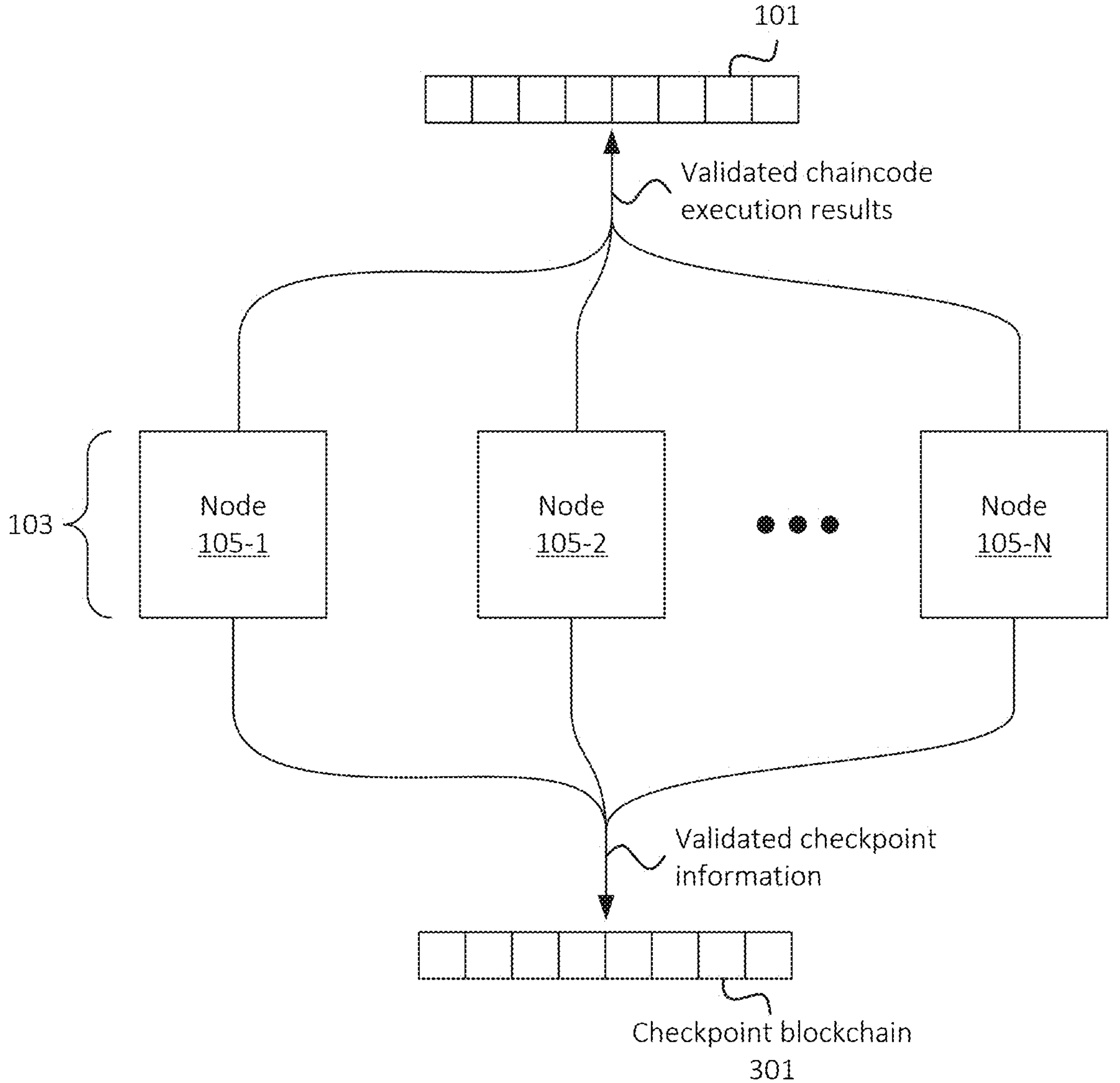
FIG. 3 illustrates an example of maintaining checkpoints in a secondary blockchain, in accordance with some embodiments.

In some embodiments, as shown in FIG. 3, multiple nodes 105 may store, record, maintain, etc. checkpoints associated with one or more portions of a given blockchain operation in a shared or cooperative manner. For example, as shown, some or all nodes of blockchain network 103 (e.g., nodes 105-1, 105-2, and 105-N in this example) may, in addition to maintaining blockchain 101, maintain checkpoint blockchain 301. In this example, the particular nodes 105 that maintain checkpoint blockchain 301 are also nodes of blockchain network 103 (e.g., which also maintain blockchain 101). In some embodiments, checkpoint blockchain 301 may be maintained in conjunction with one or more devices or systems that are not nodes of blockchain network 103. For example, such other device or system may act as a node with respect to checkpoint blockchain 301 (e.g., may participate in consensus mechanisms and/or otherwise have access to checkpoint blockchain 301), but may not have access to or may otherwise not act as a node with respect to blockchain 101.

Maintaining checkpoint blockchain 301 may include recording checkpoints (e.g., as provided at 108) to checkpoint blockchain 301. For example, checkpoint blockchain 301 may be an implementation of off-chain repository 107 in some embodiments (e.g., checkpoint blockchain 301 may be "off-chain" with respect to blockchain 101), inasmuch as checkpoint blockchain 301 may be separately maintained and accessed.

In some embodiments, recording checkpoint information to checkpoint blockchain 301 may include performing a consensus mechanism with respect to the checkpoint information. For example, while FIG. 1 is presented in the context of one node 105 generating (at 106) checkpoints associated with a given blockchain operation and providing (at 108) the checkpoints to an associated off-chain repository 107, some or all nodes 105 of blockchain network 103 may perform some or all of such operations. For example, in the example of FIG. 3, nodes 105-1, 105-2, and 105-N may each receive a request to perform the same blockchain operation, and may each identify portions of the blockchain operation for which checkpoints should be generated. In some embodiments, nodes 105-1, 105-2, and 105-N may independently identify the portions and generate the ensuing checkpoints (e.g., without communicating with each other in order to generate the checkpoints). For example, nodes 105-1, 105-2, and 105-N may each be configured with the same AI/ML models or other parameters, based on which nodes 105-1, 105-2, and 105-N may each be able to independently generate the same checkpoints.

In some embodiments, when recording checkpoints to checkpoint blockchain 301, nodes 105-1, 105-2, and 105-N may participate in a consensus mechanism, whereby checkpoints may only be recorded to checkpoint blockchain 301 if they are validated, confirmed, etc. by some or all (e.g., at least a threshold quantity, in accordance with a suitable consensus mechanism) of the other nodes that maintain checkpoint blockchain 301. For example, nodes 105-1, 105-2, and 105-N may each execute calculations, chaincode, etc. to generate a checkpoint based on the same portion (or portions) of the same requested chaincode operation, and may participate in a consensus mechanism to verify that the checkpoint (e.g., intermediate values associated with a respective portion) generated by each node matches. In this manner, the checkpoints recorded to checkpoint blockchain 301 may be "trusted," inasmuch as the checkpoints have been verified by respective nodes that maintain checkpoint blockchain 301.

Returning to FIG. 1, checkpoints recorded to off-chain repository 107 (and/or to checkpoint blockchain 301) may be used in the event that node 105 exhibits some type of failure or other condition that prevents completion of the blockchain operation (e.g., completion of all of the portions of the blockchain operation). For example, node 105 may obtain (at 110) a checkpoint associated with the blockchain operation, which may include obtaining the latest or newest checkpoint, in some implementations. For example, node 105 may obtain the checkpoint from off-chain repository 107 and/or from checkpoint blockchain 301, in accordance with some embodiments.

As discussed above, the checkpoint may include intermediate values, context information, state information, or the like, based on which node 105 may resume performing the blockchain operation. For example, node 105 may use the checkpoint information, such that resuming the failed blockchain operation may include executing fewer than all of the computations, calculations, chaincode, etc. that would be executed if the entire blockchain operation were to be restarted from the beginning.

Once node 105 has completed executing each portion of the blockchain operation (e.g., potentially multiple iterations of executing (at 106) respective portions of the blockchain operation), node 105 may participate (at 112) in a consensus mechanism based on the completed blockchain operation. For example, as discussed below, some or all of the nodes 105 of blockchain network 103 may communicate with each other to verify, validate, etc. the result of performing the completed blockchain operation. In the event that the result is verified in accordance with a suitable consensus mechanism, the result may be recorded (at 114) to blockchain 101.

In some embodiments, a particular node 105 of blockchain network 103 may fail entirely while processing a blockchain operation. For example, such node 105 may undergo a hardware failure, a network connectivity failure, or some other failure that prevents such node 105 from completing a blockchain operation that was already in progress. As shown in FIG. 4, some embodiments may resume processing the blockchain operation by a different node 105 of blockchain network 103, without requiring the different node 105 to repeat calculations, computations, etc. that were already completed by the failed node 105.

For example, as shown, a first node of blockchain network (e.g., node 105-1) may complete (at 402) portions 1 and 2 of a requested blockchain operation (e.g., a blockchain operation for which three or more portions are identified). As similarly discussed above, node 105-1 may record (at 404) a first checkpoint (e.g., a checkpoint generated based on completing portion 1) to checkpoint blockchain 301, and may record (at 406) a second checkpoint (e.g., a checkpoint generated based on completing portion 2) to checkpoint blockchain 301. As discussed above, recording such checkpoints to checkpoint blockchain 301 may include participating in a consensus mechanism, in which the checkpoints are verified by one or more other nodes. During the processing of a third portion of the blockchain operation, node 105-1 may undergo (at 408) a node failure that prevents node 105-1 from completing the third portion (and therefore preventing node 105-1 from completing the blockchain operation as a whole).

Node 105-2 may identify (at 410) the failure of node 105-1. For example, node 105-1 may output an error or failure notification to node 105-2, node 105-2 may identify the failure of node 105-1 based on communicating with (or attempting to communicate with) node 105-1, a blockchain management system may identify the failure of node 105-1 based on monitoring node 105-1, and/or node 105-2 may identify the failure of node 105-1 in some other suitable manner. Node 105-2 may, in some embodiments, be designated (e.g., by a blockchain management system of blockchain network 103 and/or by some other suitable mechanism) to take over the role of failed node 105-1. In some embodiments, node 105-2 may be instantiated or "spun up" based on a detection (e.g., by a blockchain management system that configures or provisions nodes 105) of the failure of node 105-1.

In some embodiments, node 105-2 may identify or receive an indication of the blockchain operation that was being processed by node 105-1 when node 105-1 failed. For example, node 105-2 may receive such indication from node 105-1, from a blockchain management system of blockchain network 103, from a client device that initially requested the blockchain operation, and/or from some other suitable source.

Node 105-2 may accordingly obtain (at 412) one or more checkpoints associated with the blockchain operation that was being processed by node 105-1. For example, node 105-2 may identify one or more blocks of checkpoint blockchain 301 that include an identifier of the requested blockchain operation. In this example, a first block may include the first checkpoint associated with the requested blockchain operation, and a second block may include the second checkpoint associated with the requested blockchain operation. In some embodiments, node 105-2 may obtain the latest (e.g., last recorded) block associated with the blockchain operation (e.g., the latest block that includes the identifier of the blockchain operation). In some embodiments, node 105-2 may identify the appropriate checkpoint, recorded to checkpoint blockchain 301, in some other suitable manner.

Node 105-2 may accordingly resume (at 414) processing the blockchain operation that node 105-1 was processing prior to undergoing the failure condition. For example, node 105-2 may begin executing calculations, computations, etc. of portion 3 (and subsequent portions, if applicable) of the blockchain operation, using checkpoint 2 as an input. In this manner, the resiliency of blockchain network 103 may be enhanced, while minimizing the performance impacts of failures of nodes 105 of blockchain network 103.

Figure 5:
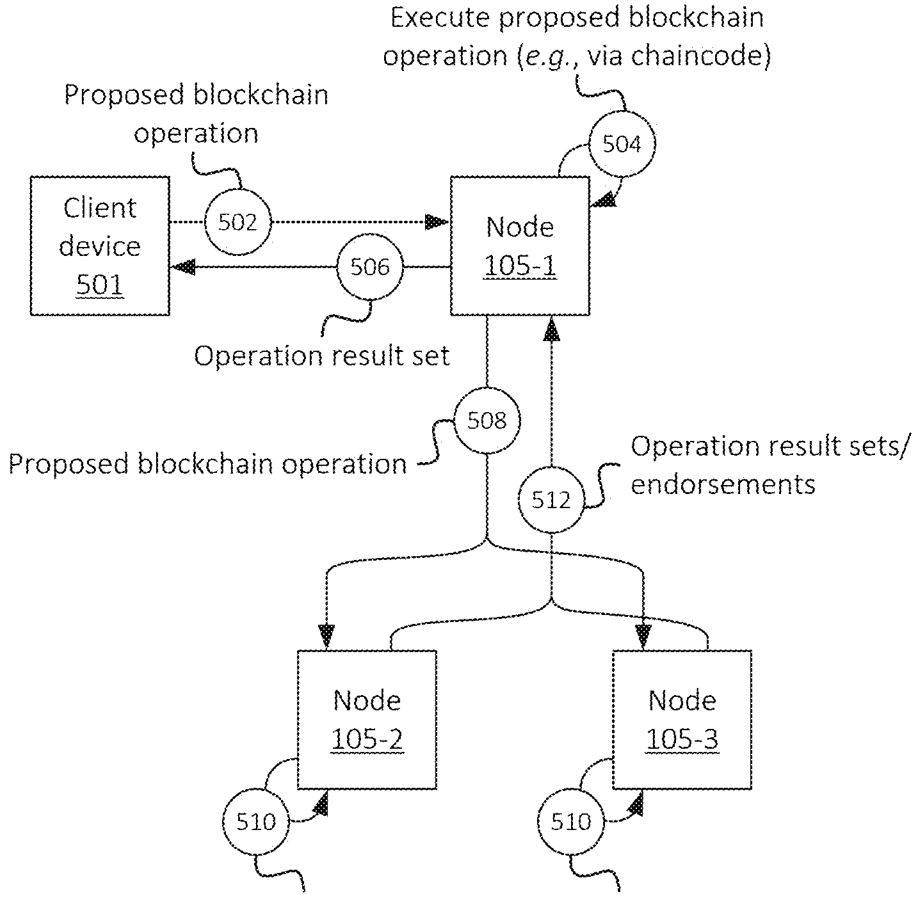
FIGS. 5 and 6 illustrate example operations associated with recording information to a blockchain, in accordance with some embodiments.
Figure 6:
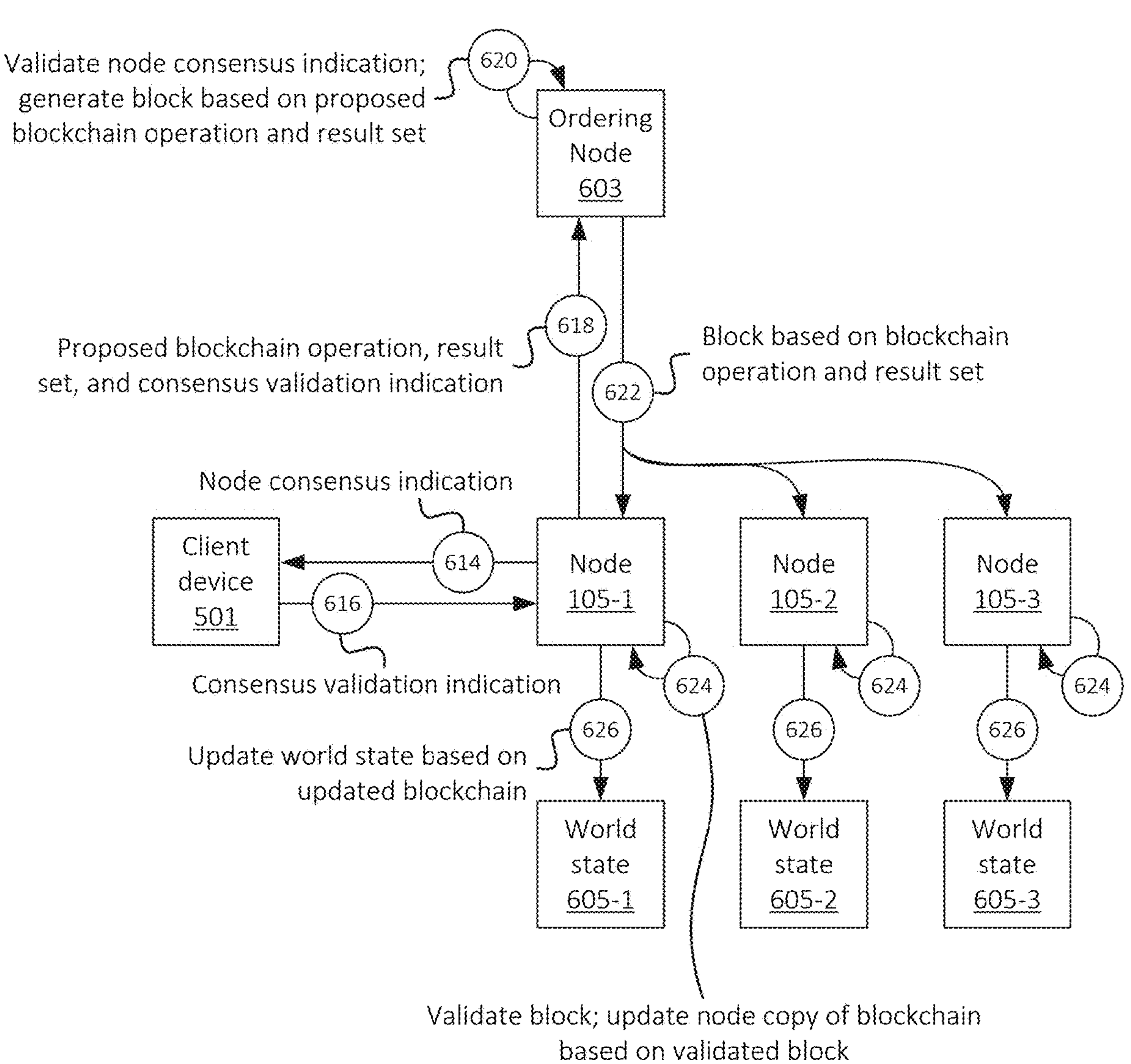

FIGS. 5 and 6 illustrate an example of modifying blockchain 101 and/or world state information based on an interaction with blockchain 101. As shown, a particular node 105-1 may receive (at 502) a proposed blockchain operation (e.g., a request to access or record information to blockchain 101) from a particular source, such as client device 501 (e.g., which may be or may be implemented by a device or system that has access to node 105-1, such as a device or system that has authentication credentials, locator information, etc. via which client device 501 is able to interact with node 105-1). In some embodiments, node 105-1 may receive the proposed blockchain operation from a blockchain management system (e.g., which may receive the proposed blockchain operation from client device 501 and may select node 105-1 out of a group of nodes 105, such as a group of nodes associated with the same channel in a channel-based blockchain system, such as the Hyperledger® Fabric), an ordering node, or other suitable device or system.

Client device 501 may be, for example, an entity associated with blockchain 101 (e.g., may be associated with an address, a "wallet," a decentralized application ("dApp"), etc.). In this example, assume that client device 501 is authorized to initiate, request, etc. the proposed blockchain operation, which may include the modification of one or more values of one or more attributes that are currently associated with blockchain 101, the addition of one or more attributes to blockchain 101, or other suitable interactions. In other examples, node 105-1 and/or some other device or system may verify that client device 501 is authorized to initiate the proposed blockchain operation.

In some embodiments, the proposed blockchain operation (received at 502) may indicate or refer to chaincode recorded to blockchain 101, which may specify one or more inputs (e.g., types of inputs, quantity of inputs, and/or other input parameters), and may also include actions to take with respect to the inputs in order to generate one or more outputs (e.g., chaincode). For example, the proposed blockchain operation may specify particular chaincode (e.g., an address or reference associated with blockchain 101 that includes a record with which the chaincode is associated, a name or identifier of the particular chaincode, or the like) and one or more input values according to input parameters specified by the particular chaincode. In some examples, the proposed blockchain operation may refer to one or more values that have previously been recorded to blockchain 101 (and thus reflected in world state information associated with blockchain 101), such as an interaction that increments or decrements previously recorded values or performs other computations based on previously recorded values.

Node 105-1 may execute (at 504) the proposed blockchain operation, which may include accessing the one or more values that were previously recorded to blockchain 101. In order to determine the one or more values referred to in the proposed blockchain operation, node 105-1 may access world state information, maintained by node 105-1, to determine such values. Such access may include checking a local cache and/or accessing, via a network, a remote system (e.g., a "cloud" system, a containerized system, etc.) associated with node 105-1 that maintains the world state associated with blockchain 101. The execution (at 504) may be a "simulation" of the proposed blockchain operation, inasmuch as the execution and of the proposed blockchain operation and the ensuing result may not yet be recorded to blockchain 101. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction. As discussed above, executing (at 504) the proposed blockchain operation may include identifying portions of the proposed blockchain operation, generating one or more checkpoints associated with respective portions of the proposed blockchain operation when executing the portions of the blockchain operation, and using the checkpoints to resume executing the blockchain operation in the event of a disruption, such as a failure associated with a given node 105.

Node 105-1 may provide (at 506) the result set (e.g., the read-write set) based on executing (at 504) the proposed interaction to client device 501. Client device 501 may maintain the result set to, for example, verify and/or to provide approval of the result set before the result set is committed to blockchain 101. Node 105-1 may also provide (at 508) the proposed blockchain operation to one or more other nodes 105 associated with blockchain 101, such as nodes 105-2 and 105-3. In some embodiments, node 105-1 may provide (at 508) the result set generated by node 105-1 to nodes 105-2 and 105-3. Nodes 105-1 through 105-3 may all be associated with the same channel, nodes 105-2 and 105-3 may be specified by the chaincode as validators, and/or nodes 105-2 and 105-3 may otherwise be identified by node 105-1 or an associated blockchain management system as nodes that should validate, endorse, etc. the execution and result of the proposed interaction.

As similarly discussed with respect to node 105-1, nodes 105-2 and 105-3 may execute (at 510), and/or simulate the execution of, the proposed interaction. Accordingly, nodes 105-2 and 105-3 may access one or more values that were previously recorded to blockchain 101 using world state information maintained by nodes 105-2 and 105-3. Nodes 105-2 and 105-3 may validate, verify, etc. the result set generated by node 105-1 by comparing the result set with respective result sets generated by nodes 105-2 and 105-3. Nodes 105-2 and 105-3 may respond (at 512) to node 105-1 with respective result sets generated by nodes 105-2 and 105-3, and/or may respond with an indication, endorsement, etc. (e.g., which may be respectively signed by nodes 105-2 and 105-3) that the result set generated by node 105-1 is valid. Once node 105-1 has received endorsements from at least a threshold quantity of other nodes (e.g., from nodes 105-2 and 105-3, in this example), node 105-1 may determine that a consensus has been reached with respect to the result set for the proposed interaction.

As shown in FIG. 6, node 105-1 may accordingly provide (at 614), to client device 501, an indication that consensus for the result set (provided at 506) has been reached. In some embodiments, client device 501 may validate the consensus (e.g., by evaluating signatures of nodes 105-2 and 105-3) and/or may verify the result set (e.g., by itself executing the proposed interaction). Client device 501 may provide (at 616), to node 105-1, an indication that client device 501 has validated the consensus and/or has verified the result set. In some embodiments, the consensus validation indication may be signed by client device 501, thus securely authenticating the validation by client device 501.

Node 105-1 may provide (at 618) the result set, along with the consensus validation indication and the proposed blockchain operation, to ordering node 603. Ordering node 603 may be a node, associated with the same channel as nodes 105-1 through 105-3, that validates (at 620) the consensus validation indication (e.g., validates signatures associated with client device 501 and/or nodes 105-1 through 105-3) and generates a block, to be recorded to blockchain 101, that includes information regarding the blockchain operation. Such information may include an identifier of client device 501 (e.g., an address, wallet identifier, etc.), identifiers of nodes 105-1 through 105-3 that participated in generating and/or validating the result set based on the blockchain operation, chaincode inputs provided by client device 501, the consensus validation indication, one or more timestamps of the above operations and/or other events, and/or other suitable information associated with the blockchain operation. In some embodiments, the block may be signed by ordering node 603, thus securely authenticating the block creation by ordering node 603. At this point, the blockchain operation may no longer be a "proposed" blockchain operation, as the interaction has been finalized, committed, etc. by ordering node 603. In some implementations, nodes 105-1 through 105-3 may be referred to as "peers," to indicate that such nodes 105-1 through 105-3 are distinct from ordering node 603 (e.g., ordering node 603 performs one or more different operations from the peers).

Ordering node 603 may propagate (at 622) the signed block, including information regarding the finalized blockchain operation initiated by client device 501, to nodes 105-1 through 105-3 and/or other nodes associated with the same channel. Nodes 105-1 through 105-3 may validate (at 624) the block, which may include verifying the signature of ordering node 603, and may accordingly update a respective copy of blockchain 101 as maintained by each one of nodes 105-1 through 105-3. Nodes 105-1 through 105-3 may maintain respective independent copies of blockchain 101, thus providing an element of decentralization to blockchain 101. As such, when adding the block (received at 622), nodes 105-1 through 105-3 may continue to maintain separate copies of the same blockchain 101, including the information regarding the finalized blockchain operation.

Nodes 105-1 through 105-3 may also maintain respective world state information 605 (e.g., world state information 605-1, 605-2, and 605-3). For example, world state information 605 may include a portion of the information stored in blockchain 101, such as the latest version of some or all of the attributes for which information has been recorded to blockchain 101. Nodes 105-1 through 105-3 may accordingly update (at 626) respective copies of world state information 605 based on the received block. For example, in the event that the block includes a change in the value of a particular attribute, nodes 105-1 through 105-3 may update world state information 605-1 through 605-3, respectively, to replace a previous value of the attribute (e.g., a previous version of the attribute) with the newly received value of the particular attribute.

Figure 7:
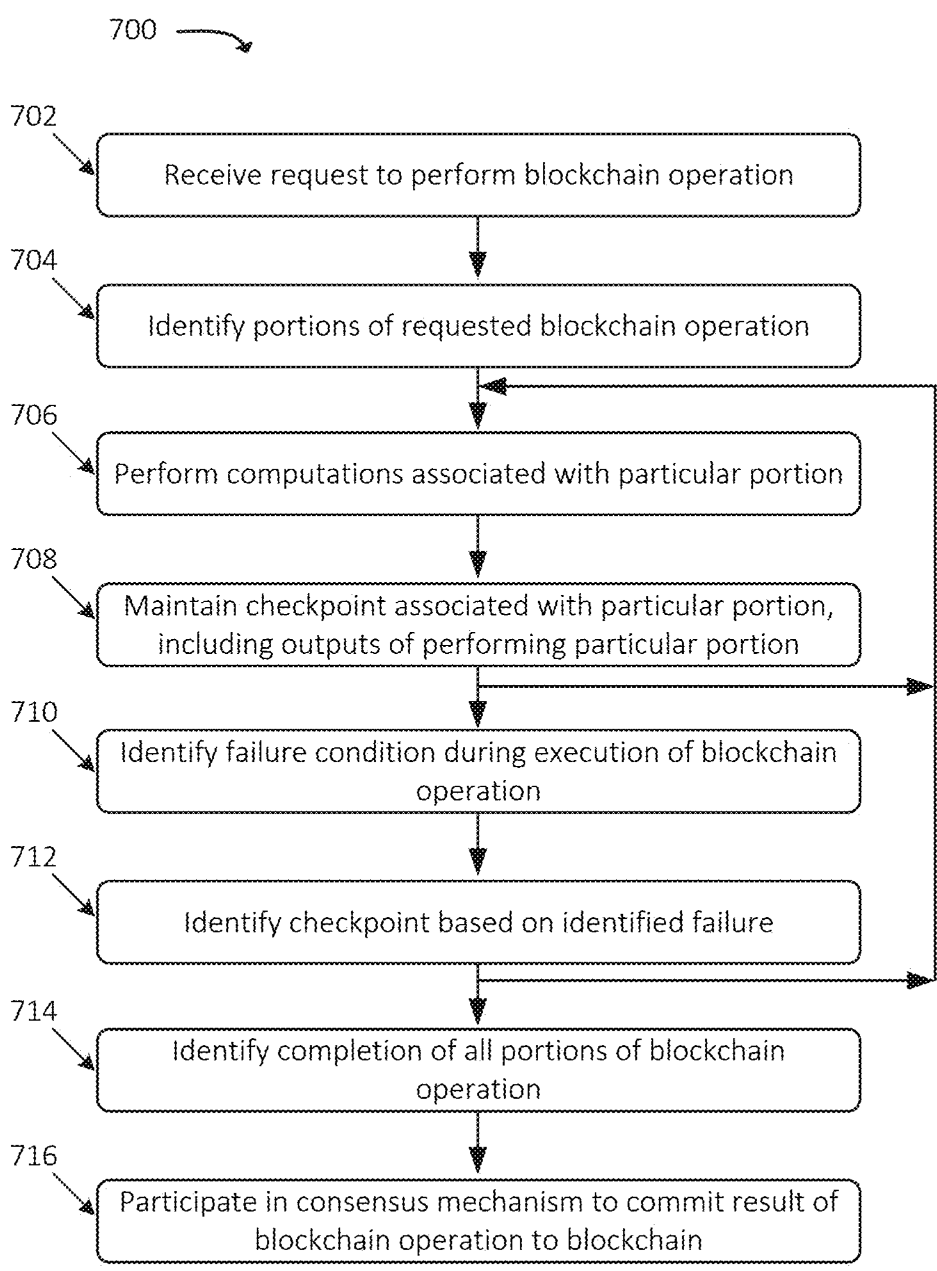
FIG. 7 illustrates an example process for a checkpoint-based resumption of an interrupted blockchain operation, in accordance with some embodiments.

FIG. 7 illustrates an example process 700 for a checkpoint-based resumption of an interrupted blockchain operation, in accordance with some embodiments. In some embodiments, some or all of process 700 may be performed by a particular node 105.

As shown, process 700 may include receiving (at 702) a request to perform a blockchain operation. For example, node 105 may receive (e.g., as similarly discussed above at 102 and/or 502) a proposed blockchain operation, which may include a request to execute chaincode or other types of code or computations. The blockchain operation may include, for example, a set of operations to perform, such as computations, calculations, communicating with one or more external devices, accessing data recorded to blockchain 101, etc.

Process 700 may further include identifying (at 704) portions of the requested blockchain operation. For example, as discussed above, node 105 may utilize AI/ML techniques, code analysis techniques, code complexity determination techniques, simulations, and/or other techniques in order to identify portions of the blockchain operation. As discussed above, in one example, node 105 may identify particular function calls or other types of discrete operations indicated in the blockchain operation, and may identify portions based on the identified function calls. In some embodiments, node 105 may utilize some other suitable techniques to identify portions of the blockchain operation in some other suitable manner. Each portion may include, for example, a subset of the set of operations included in the requested blockchain operation.

Process 700 may additionally include performing (at 706) computations associated with a particular portion of the blockchain operation, and maintaining (at 708) maintaining a checkpoint associated with the particular portion, including a set of outputs of performing the particular portion. For example, as discussed above, node 105 may maintain the checkpoint in off-chain repository 107, checkpoint blockchain 301, and/or in some other suitable manner. The checkpoint may include, for example, a set of outputs generated as a result of performing the computations of the particular portion of the blockchain operation. Additionally, or alternatively, the checkpoint may include intermediate values, variables, state information, etc. generated and/or used by node 105 in the course of performing the computations associated with the particular portion of the blockchain operation. As discussed above, blocks 706 and 708 may be repeated in an iterative manner, for each identified portion of the blockchain operation.

Process 700 may further include identifying (at 710) a failure condition during execution of another portion of the proposed blockchain operation. For example, as discussed above, node 105 may identify a network connectivity failure, a hardware failure, and/or some other failure. In some embodiments, the failure condition may include tracking a duration of time spent by node 105 to perform a given portion of the blockchain operation, and determining that the duration of time spent exceeds a threshold duration of time (e.g., a "time out" condition).

Process 700 may additionally include identifying (at 712) a checkpoint based on the identified failure condition. For example, node 105 may identify a checkpoint associated with a previously completed portion of the blockchain operation (e.g., as maintained in off-chain repository 107 and/or checkpoint blockchain 301). In some embodiments, node 105 may identify a checkpoint generated by a different node, where such checkpoint is associated with the previously completed portion of the blockchain operation.

Process 700 may proceed to continue to perform (at another iteration of 706) computations associated with a respective portion of the blockchain operation (e.g., a portion during which a failure condition was detected), using the checkpoint. For example, node 105 may use state information, variables, intermediate values, outputs, etc. associated with the checkpoint as input values, state information, etc. of the portion of the blockchain operation during which the failure condition was determined. In this sense, node 105 may "resume" the blockchain operation without restarting the blockchain operation (e.g., without re-performing computations that were performed to generate previous checkpoints).

Process 700 may also include identifying (at 714) completion of all portions of the blockchain operation. For example, once node 105 has completed all of the portions of the blockchain operation (e.g., potentially using checkpoints in the event of failure conditions to resume performing the blockchain operation), the blockchain operation may be considered as complete with respect to node 105 (e.g., the completed blockchain operation may be an operation result set, as discussed above (at 506). Process 700 may further include participating (at 716) in a consensus mechanism to ultimately record the result set to blockchain 101, as discussed above.

Figure 8:
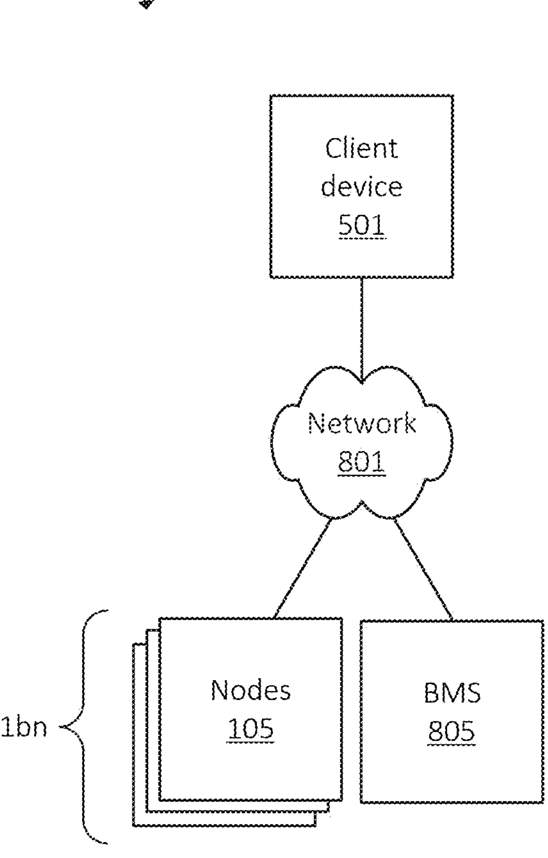
FIG. 8 illustrates an example environment in which one or more embodiments, described herein, may be implemented.

FIG. 8 illustrates an example environment 800, in which one or more embodiments may be implemented. Environment 800 may include network 801, client device 501, Blockchain Management System ("BMS") 805, and nodes 105. In some embodiments, environment 800 may include one or more additional devices or systems communicatively coupled to network 801 and/or one or more other networks.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800. Elements of environment 800 may interconnect with each other and/or other devices via wired connections, wireless connections, or a combination of wired and wireless connections. Some or all of the elements of environment 800 may be implemented by one or more devices, sets of hardware resources, cloud systems, or the like.

Network 801 may include one or more wired and/or wireless networks. For example, network 801 may include an IP-based Packet Data Network ("PDN"), a wide area network ("WAN") such as the Internet, a private enterprise network, and/or one or more other networks. Client device 501, BMS 805, nodes 105, and/or other devices or systems may communicate, through network 801, with each other and/or with other devices that are coupled to network 801. Network 801 may be connected to one or more other networks, such as a public switched telephone network ("PSTN"), a public land mobile network ("PLMN"), and/or another network. Network 801 may be connected to one or more devices, such as content providers, applications, web servers, and/or other devices, with which client device 501, BMS 805, nodes 105, and/or other devices or systems may communicate.

Client device 501, BMS 805, nodes 105, and/or other devices or systems may be implemented by one or more cloud systems, server devices, or other types of hardware resources. In some embodiments, client device 501, BMS 805, and/or nodes 105 may be implemented by or communicatively coupled to a User Equipment ("UE"), which may include a computation and communication device, such as a wireless mobile communication device that is capable of communicating with network 801. The UE may communicate with network 801 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device.

Figure 9:
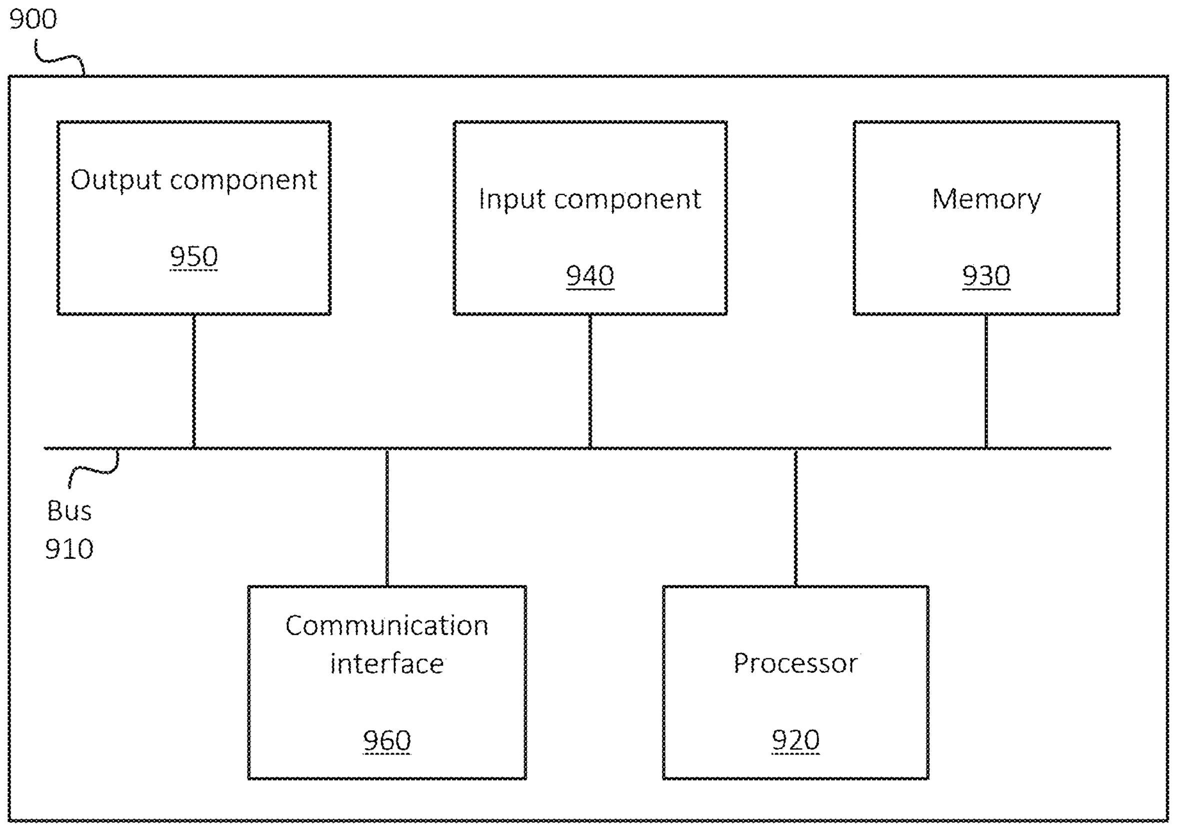
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, a set of provisioned hardware resources of a cloud computing system, or other suitable type of hardware that interprets and/or executes instructions (e.g., processor-executable instructions). In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or otherwise receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems (e.g., via a RAN, a wired network, the Internet, etc.). For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 900 may include more than one communication interface 960. For instance, device 900 may include an optical interface, a wireless interface, an Ethernet interface, and/or one or more other interfaces.

Device 900 may perform certain operations relating to one or more processes described above. Device 900 may perform these operations in response to processor 920 executing instructions, such as software instructions, processor-executable instructions, etc. stored in a computer-readable medium, such as memory 930. A computer-readable medium may be defined as a non-transitory memory device. A memory device may include space within a single physical memory device or spread across multiple physical memory devices. The instructions may be read into memory 930 from another computer-readable medium or from another device. The instructions stored in memory 930 may be processor-executable instructions that cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

output, to a first node of a blockchain network that is associated with a first blockchain, a request to perform a blockchain operation, wherein performing the requested blockchain operation includes performing a set of computations, wherein the first node:

identifies a plurality of portions of the blockchain operation, wherein each portion includes a respective subset of the set of computations;

performs a first subset of computations, of the set of computations, wherein the first subset is associated with a first portion of the plurality of portions of the blockchain operation;

identifies a set of outputs that result from performing the first subset of computations; and records, to a second blockchain, the set of outputs that result from performing the first subset of computations, wherein recording the set of outputs, that result from performing the first subset of computations, to the second blockchain includes participating in a consensus mechanism with one or more other nodes of the blockchain network with respect to the set of outputs that result from performing the first subset of computations;

identify, prior to completion of the set of computations of the requested blockchain operation by the first node, a failure condition associated with the first node that prevents complete performance of a second subset of computations that is associated with a second portion of the set of computations;

after identifying the failure condition, output, to a second node of the blockchain network, a request to perform the second subset of computations using the set of outputs that result from performing the first subset of computations, wherein the second node:

identifies the set of outputs recorded to the second blockchain by the first node;

performs the second subset of computations; and communicates with the one or more other nodes of the blockchain network to record a result of performing the first and second subsets of computations to the first blockchain.

2. The device of claim 1, wherein the set of computations includes chaincode.

3. The device of claim 1, wherein the set of outputs that result from performing the first subset of computations includes a set of intermediate values with respect to the set of computations.

4. The device of claim 1, wherein the requested blockchain operation includes a plurality of function calls, wherein the first portion includes a first function call of the plurality of function calls and wherein the second portion includes a second function call of the plurality of function calls.

5. The device of claim 1, wherein identifying the failure condition includes determining that the second subset of computations has not been completed by the first node within a threshold amount of time.

6. The device of claim 1, wherein identifying the failure condition includes determining a network connectivity failure associated with the first node.

7. The device of claim 1, wherein the plurality of portions of the blockchain operation further include a third subset of computations, wherein the first node further:

performs, prior to performing the first subset of computations, the third subset of computations;

identifies a set of outputs that result from performing the third subset of computations; and records, to the second blockchain, the set of outputs that result from performing the third subset of computations, wherein the second node further:

identifies that the set of outputs that result from performing the third subset of computations were recorded to the second blockchain before the set of outputs that result from performing the first subset of computations were recorded to the second blockchain; and uses the set of outputs that result from performing the first subset of computations, in lieu of using the set of outputs that result from performing the third subset of computations, when performing the second subset of computations based on identifying that the set of outputs that result from performing the third subset of computations were recorded to the second blockchain before the set of outputs that result from performing the first subset of computations were recorded to the second blockchain.

8. A non-transitory computer-readable medium, storing a plurality of processor-executable instructions to:

output, to a first node of a blockchain network that is associated with a first blockchain, a request to perform a blockchain operation, wherein performing the requested blockchain operation includes performing a set of computations, wherein the first node:

identifies a plurality of portions of the blockchain operation, wherein each portion includes a respective subset of the set of computations;

performs a first subset of computations, of the set of computations, wherein the first subset is associated with a first portion of the plurality of portions of the blockchain operation;

identifies a set of outputs that result from performing the first subset of computations; and records, to a second blockchain, the set of outputs that result from performing the first subset of computations, wherein recording the set of outputs, that result from performing the first subset of computations, to the second blockchain includes participating in a consensus mechanism with one or more other nodes of the blockchain network with respect to the set of outputs that result from performing the first subset of computations;

identify, prior to completion of the set of computations of the requested blockchain operation by the first node, a failure condition associated with the first node that prevents complete performance of a second subset of computations that is associated with a second portion of the set of computations;

after identifying the failure condition, output, to a second node of the blockchain network, a request to perform the second subset of computations using the set of outputs that result from performing the first subset of computations, wherein the second node:

identifies the set of outputs recorded to the second blockchain by the first node;

performs the second subset of computations; and communicates with the one or more other nodes of the blockchain network to record a result of performing the first and second subsets of computations to the first blockchain.

9. The non-transitory computer-readable medium of claim 8, wherein the set of computations includes chaincode.

10. The non-transitory computer-readable medium of claim 8, wherein the set of outputs that result from performing the first subset of computations includes a set of intermediate values with respect to the set of computations.

11. The non-transitory computer-readable medium of claim 8, wherein the requested blockchain operation includes a plurality of function calls, wherein the first portion includes a first function call of the plurality of function calls and wherein the second portion includes a second function call of the plurality of function calls.

12. The non-transitory computer-readable medium of claim 8, wherein identifying the failure condition includes determining that the second subset of computations has not been completed by the first node within a threshold amount of time.

13. The non-transitory computer-readable medium of claim 8, wherein identifying the failure condition includes determining a network connectivity failure associated with the first node.

14. The non-transitory computer-readable medium of claim 8, wherein the plurality of portions of the blockchain operation further include a third subset of computations, wherein the first node further:

performs, prior to performing the first subset of computations, the third subset of computations;

identifies a set of outputs that result from performing the third subset of computations; and records, to the second blockchain, the set of outputs that result from performing the third subset of computations, wherein the second node further:

identifies that the set of outputs that result from performing the third subset of computations were recorded to the second blockchain before the set of outputs that result from performing the first subset of computations were recorded to the second blockchain; and uses the set of outputs that result from performing the first subset of computations, in lieu of using the set of outputs that result from performing the third subset of computations, when performing the second subset of computations based on identifying that the set of outputs that result from performing the third subset of computations were recorded to the second blockchain before the set of outputs that result from performing the first subset of computations were recorded to the second blockchain.

15. A method, comprising:

outputting, to a first node of a blockchain network that is associated with a first blockchain, a request to perform a blockchain operation, wherein performing the requested blockchain operation includes performing a set of computations, wherein the first node:

identifies a plurality of portions of the blockchain operation, wherein each portion includes a respective subset of the set of computations;

performs a first subset of computations, of the set of computations, wherein the first subset is associated with a first portion of the plurality of portions of the blockchain operation;

identifies a set of outputs that result from performing the first subset of computations; and records, to a second blockchain, the set of outputs that result from performing the first subset of computations, wherein recording the set of outputs, that result from performing the first subset of computations, to the second blockchain includes participating in a consensus mechanism with one or more other nodes of the blockchain network with respect to the set of outputs that result from performing the first subset of computations;

identifying, prior to completion of the set of computations of the requested blockchain operation by the first node, a failure condition associated with the first node that prevents complete performance of a second subset of computations that is associated with a second portion of the set of computations;

after identifying the failure condition, outputting, to a second node of the blockchain network, a request to perform the second subset of computations using the set of outputs that result from performing the first subset of computations, wherein the second node:

identifies the set of outputs recorded to the second blockchain by the first node;

performs the second subset of computations; and communicating with the one or more other nodes of the blockchain network to record a result of performing the first and second subsets of computations to the first blockchain.

16. The method of claim 15, wherein the set of computations includes chaincode.

17. The method of claim 15, wherein the set of outputs that result from performing the first subset of computations includes a set of intermediate values with respect to the set of computations.

18. The method of claim 15, wherein the requested blockchain operation includes a plurality of function calls, wherein the first portion includes a first function call of the plurality of function calls and wherein the second portion includes a second function call of the plurality of function calls.

19. The method of claim 15, wherein identifying the failure condition includes determining that the second subset of computations has not been completed by the first node within a threshold amount of time.

20. The method of claim 15, wherein the plurality of portions of the blockchain operation further include a third subset of computations, wherein the first node further:

performs, prior to performing the first subset of computations, the third subset of computations;

identifies a set of outputs that result from performing the third subset of computations; and records, to the second blockchain, the set of outputs that result from performing the third subset of computations, wherein the second node further:

identifies that the set of outputs that result from performing the third subset of computations were recorded to the second blockchain before the set of outputs that result from performing the first subset of computations were recorded to the second blockchain; and uses the set of outputs that result from performing the first subset of computations, in lieu of using the set of outputs that result from performing the third subset of computations, when performing the second subset of computations based on identifying that the set of outputs that result from performing the third subset of computations were recorded to the second blockchain before the set of outputs that result from performing the first subset of computations were recorded to the second blockchain.

* * * * *